March 29, 1966 W. WINKLER ET AL 3,242,757
GEAR-SHIFT MECHANISM FOR MOTOR VEHICLES
Filed Sept. 14, 1962 3 Sheets-Sheet 1

Inventor
WILHELM WINKLER
WILLI MULLER
By Toulmin & Toulmin
Attorneys

March 29, 1966 W. WINKLER ET AL 3,242,757
GEAR-SHIFT MECHANISM FOR MOTOR VEHICLES
Filed Sept. 14, 1962 3 Sheets-Sheet 2

Inventor
WILHELM WINKLER
WILLI MULLER
By Toulmin & Toulmin
Attorneys

March 29, 1966    W. WINKLER ET AL    3,242,757
GEAR-SHIFT MECHANISM FOR MOTOR VEHICLES
Filed Sept. 14, 1962      3 Sheets-Sheet 3

Inventor
WILHELM WINKLER
WILLI MULLER
By Toulmin & Toulmin
Attorneys 3,242,757
GEAR-SHIFT MECHANISM FOR MOTOR
VEHICLES
Wilhelm Winkler and Willi Müller, Aschaffenburg, Germany, assignors to Gesellschaft fur Linde's Eismaschinen Aktiengesellschaft, Wiesbaden, Germany
Filed Sept. 14, 1962, Ser. No. 223,622
Claims priority, application Germany, Oct. 23, 1961,
G 33,411
4 Claims. (Cl. 74—473)

This invention relates to a gear-shift mechanism for motor vehicles, and especially for tractors, in which the gears are shifted by parallel slidable rods which are actuated by a lever mechanism within reach of the operator at the steering wheel.

The lever mechanism may be carried either by a separate pedestal adjacent the steering column, or by the steering column itself. It may consist of either a single lever pivotally mounted for swinging movement in two planes, or of two separately operable levers for selectively shifting either one of two different gear trains which may be independent of one another, or may be connected in series. The present construction is characterized by its mechanical simplicity and by its close proximity to the steering column so as to leave the space under the steering wheel free and unobstructed.

Figures 1, 2:
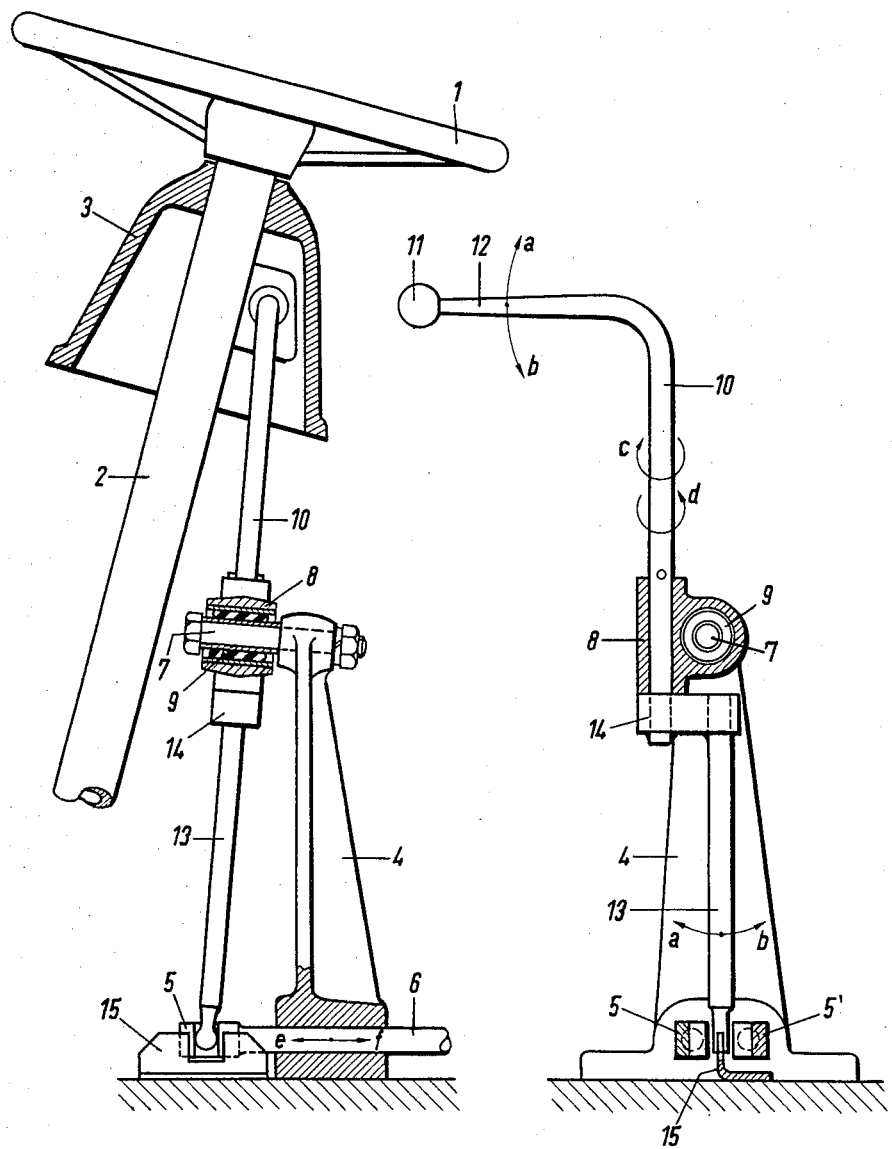
Figure 3:
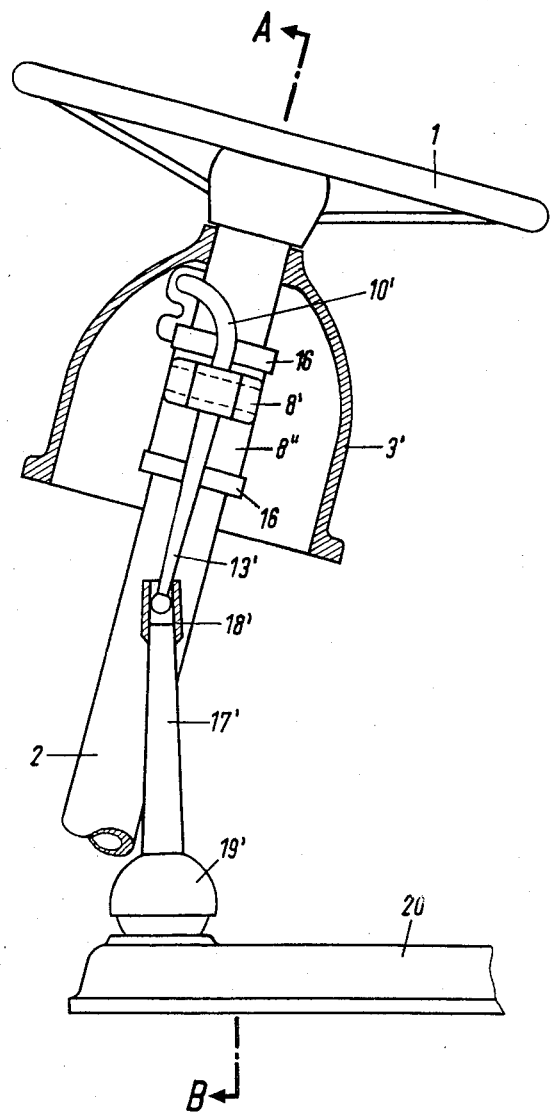
Figure 4:
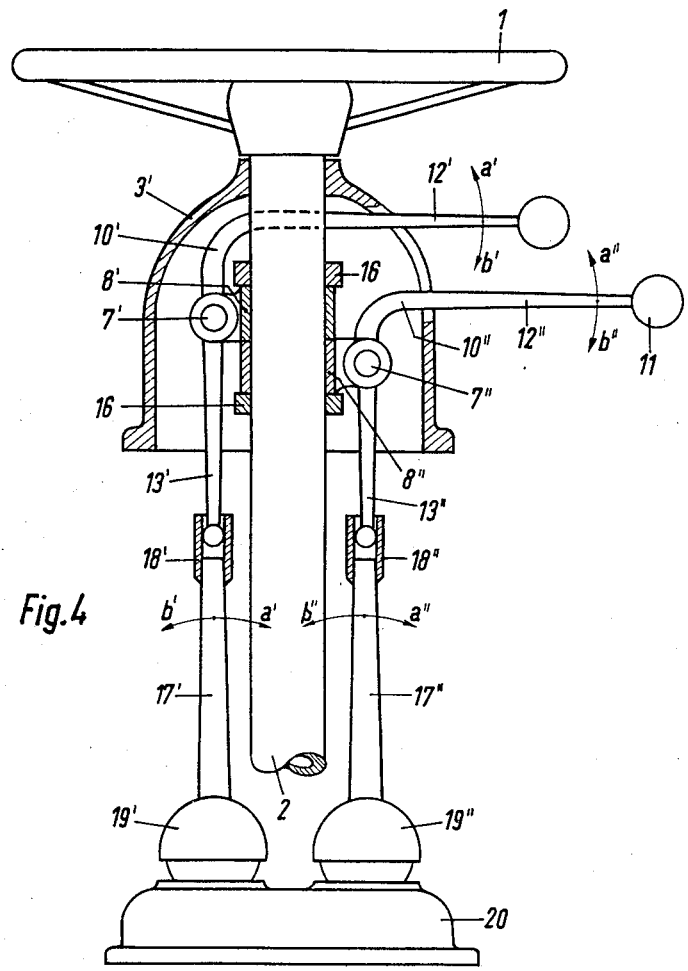

In the drawing, which illustrates two embodiments of this invention, partly in cross-section, FIGURE 1 shows a gear-shift linkage in side elevation;
FIGURE 2 shows the same linkage in front elevation;
FIGURE 3 shows a modified linkage in side elevation;
FIGURE 4 is a view taken along line A–B in FIG. 3; and
FIGURE 5 shows the modification in plan view.

In the construction shown in FIGS. 1 and 2, the steering column 2 is supported at its lower end in the usual manner, while its upper end passes through and is supported by a hood 3 mounted on the instrument panel directly behind the steering wheel. A bearing pedestal 4 is firmly secured to the chassis and carries a pivot bolt 7 upon which a bearing block 8 is swingably mounted by means of an intermediate resilient rubber cushion 9 for pivotal movement in an approximately upright plane. In this bearing block the manually actuatable gear shift lever 10 is pivotally mounted for movement in a transverse plane, as indicated by the curved arrows c and d in FIG. 2. At its upper end the lever 10 is bent laterally to form the control arm 12, terminating in the knob 11. Immediately behind the bearing block 8 the lever 10 carries a laterally extending arm 14 to which is secured a rod 13 whose lower end is adapted to engage either the head 5 or the head 5′, each connected to a slidable gear shift rod 6 for actuation in either direction, as indicated by the double arrow e–f for changing the speed ratio of the transmission. Between the heads 5 and 5′ there is a guard plate 15 which permits the end of the rod 13 to be brought into engagement with either of these heads only after the other head has been brought into neutral position. Such transfer of the lever from one head to the other is brought about by swinging of the lever in one sense or the other about the pivot bolt 7 as indicated by the arrows a and b.

The mode of operation is as follows: After deciding which of the two rods 6 is to be shifted, the arm 12 is swung up or down in the direction of the arrow a or b to move the lever 10 in the same sense about the pivot bolt 7, which will put the rubber cushion 9 under compression. After the end of the rod 13 engages the selected head 5 or 5′, the corresponding gear shift rod 6 will be actuated by swinging the arm 12 horizontally in the direction of the arrow c or d.

Figure 5:
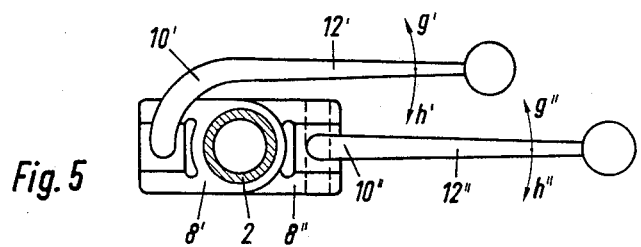

In the construction shown in FIGS. 3, 4 and 5, the gear-shift mechanism is constituted of two gear-shift devices arranged in series so that the one serves as a range selector for the other. Both of these devices operate through the same housing cap 20 on which the two domes 19′ and 19″ are positioned; in these domes the two gear-shift levers 17′ and 17″ are pivotally mounted. The lever 17′ is rigidly connected to a tubular extension 18′ while the lever 17″ is rigidly connected to a tubular extension 18″. A knob on the lower end 13′ of the manually actuated gear-shaft lever 10′ operates in the extension 18′, while a similar knob on the lower end 13″ of the lever 10″ operates in the extension 18″. The lever 10′ is pivotally mounted on the upper bearing block 8′ for universal movement about the steering column 2, while the lever 10″ is pivotally mounted on the lower bearing block 8″ for similar universal movement about the steering column. Two collars 16 on the steering column prevent the longitudinal movement of the bearing blocks on the column, but permit their pivotal movement about the column.

If a certain range is to be selected by means of the gear-shift lever 17′, the control arm 12′ is first swung vertically in the direction of the arrow a′ or b′ for engagement of the desired gear-shift rod 6, whereupon it is swung horizontally around the axis of the steering column in the direction of the arrow g′ or h′ to move the selected gear-shift rod in one direction or the other.

If a certain range is to be selected by means of the gear-shift lever 17″, the arm 12″ is first swung vertically in the direction a″ or b″ for engagement of the desired gear-shift rod, whereupon it is swung horizontally in the direction g″ or h″ to move the selected gear shift rod.

It is to be understood that the above described embodiments of my invention are for the purpose of illustration only, and that changes may be made within the scope of the claims.

What is claimed is:

1. In a motor vehicle, support means, lever mechanism for selectively engaging and actuating either one of two slidable gear-shift rods, said mechanism comprising a bearing block mounted on said support means for pivotal movement about an axis, a gear-shift lever rotatably mounted in the bearing block for movement about its axis which is normal to said bearing block axis, said lever terminating at a distance below the bearing block, and means for transmitting motion from the terminal portion of said lever to one of said gear-shift rods, the last-mentioned means comprising a laterally extending offset member under the bearing block rigidly connected at one end to said terminal portion of said lever, and a downwardly extending bar carried by the other end of said member and operable to engage either of said slidable gear-shift rods.

2. In a motor vehicle, lever mechanism for selectively engaging and actuating either one of two slidable gear-shift rods, said mechanism comprising a pedestal, a bearing block pivotally mounted on said pedestal to rotate about a substantially horizontal axis, a shift lever extending upwardly from said bearing block and mounted therein for separate rotary movement only about its own axis and bodily movable about said horizontal axis, said lever having its lower end extending below said block and having rigidly secured thereto and in offset sub-parallel relation therewith a rigid gear-operating rod, said gear-operating lever and gear-operating rod being in a plane substantially at right angles to said horizontal axis, said gear-shift rods being spaced and extending substantially parallel to said horizontal axis, the lower end of said gear-operating rod extending between said slidable gearshift rods, means selectively engaging the lower end of said gear-operating rod with one of said slidable gear-shift rods, and means for shifting said slidable rods longitudinally thereof in either direction.

3. In a motor vehicle, lever mechanism for selectively engaging and actuating either one of two slidable gear-shift rods, said mechanism comprising a pedestal, a bearing block pivotally mounted on said pedestal to rotate about a substantially horizontal axis, a shift lever extending upwardly from said bearing block and mounted therein for gear-selecting rotational movement about said horibontal axis and gear-operating rotational movement about its own axis, said lever having its lower end extending below said block and having rigidly secured thereto and in offset sub-parallel relation therewith a rigid gear-operating rod, said gear-shift rods being spaced and substantially parallel and extending substantially horizontally from the adjacent lower end of said gear-operating rod with said end being positioned therebetween, said gear-operating lever and gear-operating rod being in a plane substantially at right angles to the horizontally extending rods, means selectively engaging the lower end of said gear-operating rod with one of said slidable gear-shift rods, and means for shifting said slidable rods longitudinally thereof in either direction.

4. In a gear-shift mechanism, in combination, with a pair of independently actuatable gear-shifting members displaceable in one direction and spaced apart transversely to said one direction, support means extending above said gear-shifting members; swivel means on said support means above said gear-shifting members; a gear-shifting lever mounted on said swivel means for movement with at least two degrees of freedom and about at leat one axis generally parallel to said one direction, said lever having an upstanding portion extending above and below said swivel means; and motion-transmitting means connecting said lever selectively with said gear-shifting members, said motion-transmitting means including an arm laterally offset from said upstanding portion of said lever and depending therefrom below said swivel means between said gear-shifting members for selective engagement therewith upon rotation of said lever about said axis.

References Cited by the Examiner
UNITED STATES PATENTS

| 1,673,952 | 6/1928 | Schmidt | 74—473 |
| 2,861,465 | 11/1958 | Winkle et al. | 74—473 |

FOREIGN PATENTS

| 660,668 | 2/1929 | France. |
| 787,161 | 6/1935 | France. |
| 893,743 | 2/1944 | France. |

BROUGHTON G. DURHAM, *Primary Examiner.*

P. W. SULLIVAN, *Assistant Examiner.*